United States Patent
Debbouz et al.

(10) Patent No.: US 10,145,262 B2
(45) Date of Patent: Dec. 4, 2018

(54) METHOD FOR MONITORING A DEGREE OF CLOGGING OF THE STARTING INJECTORS OF A TURBINE ENGINE

(71) Applicant: TURBOMECA, Bordes (FR)

(72) Inventors: Nadir Christian Debbouz, Port de Lanne (FR); Philippe Patrick Marc De Barbeyrac, Anglet (FR); Florian Arnaud Jonathan Enguehard, Saint Perdon (FR); Francois Xavier Marie Faupin, Biarritz (FR); Fabien Lamazere, Ciboure (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 419 days.

(21) Appl. No.: 14/768,666

(22) PCT Filed: Feb. 14, 2014

(86) PCT No.: PCT/FR2014/050309
§ 371 (c)(1),
(2) Date: Aug. 18, 2015

(87) PCT Pub. No.: WO2014/125229
PCT Pub. Date: Aug. 21, 2014

(65) Prior Publication Data
US 2015/0377059 A1    Dec. 31, 2015

(30) Foreign Application Priority Data

Feb. 18, 2013  (FR) ...................................... 13 51359

(51) Int. Cl.
F01D 17/08   (2006.01)
F01D 19/00   (2006.01)
(Continued)

(52) U.S. Cl.
CPC ............. *F01D 17/08* (2013.01); *F01D 19/00* (2013.01); *F02C 7/22* (2013.01); *F02C 7/264* (2013.01); *F05D 2260/80* (2013.01)

(58) Field of Classification Search
CPC .... F02C 7/22; F02C 7/26; F02C 7/264; F02C 9/28; F01D 17/08; F01D 19/00; F05D 2260/80
(Continued)

(56) References Cited

U.S. PATENT DOCUMENTS 3,365,881 A     1/1968  McKenzie
4,058,975 A  * 11/1977  Gilbert ................... G01K 15/00
                                                  374/1
(Continued)

FOREIGN PATENT DOCUMENTS

FR   2 942 001 A1   8/2010
WO   90/05877 A1   5/1990

OTHER PUBLICATIONS

International Search Report dated Apr. 7, 2014 in PCT/FR14/050309 Filed Feb. 14, 2014.
(Continued)

*Primary Examiner* — Phutthiwat Wongwian
*Assistant Examiner* — Loren Edwards
(74) *Attorney, Agent, or Firm* — Oblon, McClelland, Maier & Neustadt, L.L.P.

(57) ABSTRACT

A method for monitoring a degree of clogging of the starting injectors of a turbine engine, which includes: a combustion chamber into which at least one starting injector supplied with fuel leads, the starting injectors being suitable for initiating the combustion in the chamber by igniting the fuel; and a turbine rotated by the gases resulting from the combustion of the fuel in the chamber, the method including the steps involving: the measurement, during a phase of starting
(Continued)

the turbine engine, of the temperature of the exhaust gases at the outlet of the turbine; and the determination, from the changes over time in the temperature thus measured, of a degree of clogging of the starting injectors. A system for monitoring a degree of clogging capable of implementing the method, and a turbine engine including such a system.

11 Claims, 5 Drawing Sheets

(51) Int. Cl.
*F02C 7/264* (2006.01)
*F02C 7/22* (2006.01)

(58) Field of Classification Search
USPC .......................................................... 60/776
See application file for complete search history.

(56) References Cited

U.S. PATENT DOCUMENTS

| | | |
|---|---|---|
| 4,984,424 A | 1/1991 | Shekleton |
| 7,281,382 B2 | 10/2007 | Plimpton et al. |
| 2004/0079070 A1* | 4/2004 | Macchia ............... F01D 17/085 60/39.091 |
| 2006/0059917 A1* | 3/2006 | Plimpton ................ F01D 17/08 60/772 |
| 2012/0006032 A1 | 1/2012 | Kopcho et al. |

OTHER PUBLICATIONS

International Search Report and Written Opinion dated Apr. 7, 2014 in PCT/FR2014/050309 (with English Translation of Categories of Cited Documents).

French Search Report and Written Opinion dated Dec. 2, 2013 in Patent Application No. 1351359 (with English Translation of Categories of Cited Documents).

* cited by examiner

FIG. 4a
Starting (unclogged injectors)

FIG. 4b
Starting (clogged injectors)

METHOD FOR MONITORING A DEGREE OF CLOGGING OF THE STARTING INJECTORS OF A TURBINE ENGINE

FIELD OF THE INVENTION

The field of the invention is that of the monitoring of the degree of clogging of the starting injectors in a turbine engine, and turbine engines equipped with systems enabling such monitoring.

STATE OF THE PRIOR ART

A turbine engine conventionally includes a turbine, which is rotated by the exhaust gases resulting from the combustion, in a combustion chamber, of a mixture composed of air and fuel.

In this respect, a turbine engine comprises several types of fuel injectors in the combustion chamber, among which starting injectors, which make it possible to initiate the combustion by igniting an air/fuel mixture, and main injectors, which maintain the combustion once it has been initiated, and have a higher flow rate than that of the starting injectors. The main injectors may be replaced by an injection wheel fulfilling the same function, and which sprays the fuel into the combustion chamber by centrifugation.

Figure 1A:
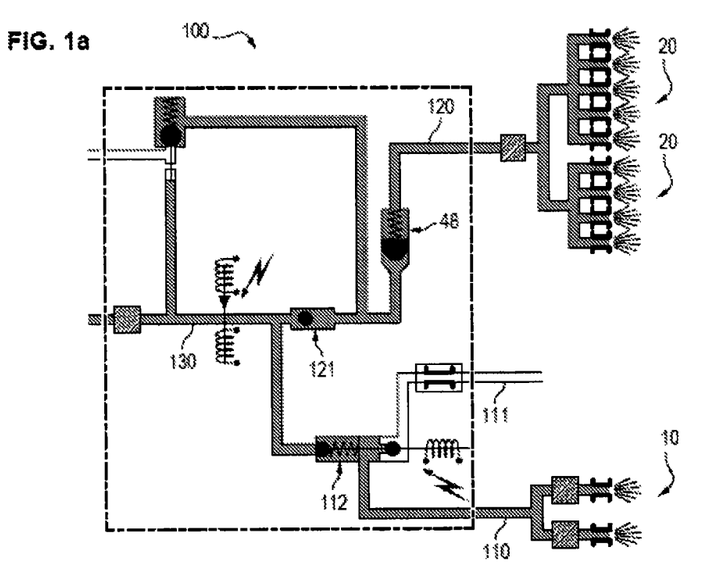
FIGS. 1a and 1b, already described, schematically represent a circuit for supplying the injectors of a turbine engine with fuel.
Figure 1B:
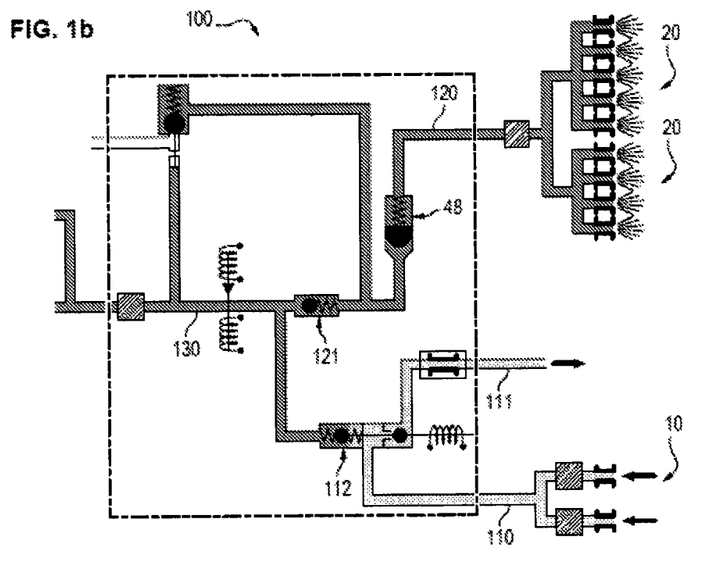

With reference to FIGS. 1a and 1b, a conventional circuit for supplying the injectors of a turbine engine with fuel is represented.

This circuit 100 includes a pipe 130 for distributing fuel to a feeder pipe 110 of the starting injectors 10, and a feeder pipe 120 of the main injectors or of the centrifugal injection wheel 20.

The feeder pipe 120 of the injection wheel comprises a check valve 121, which opens when the flow rate of fuel in the circuit exceeds a pre-established threshold. Thus, during a phase of starting of the turbine engine, the flow rate of fuel in the circuit is low, and only the starting injectors are supplied. Then, when the combustion has been initiated, the flow rate of fuel may increase so that the main injectors or the injection wheel are also supplied (situation represented in FIG. 1a).

Moreover, the circuit 100 comprises a circuit of purging 111 to the atmosphere of the starting injectors connected to the feeder pipe 110 of said injectors. These pipes may be isolated from the distribution pipe by means of an electro-valve 112, controlled electrically.

In particular, the valve 112 may be controlled to open, in order to authorise the flow of fuel to the injectors, or to close, in order to enable the purging of the starting injectors.

Once the combustion has been initiated, the two types of injectors are supplied with fuel, until the electro-valve 112 is actuated to cut off the supply of the starting injectors. The fuel is then sprayed into the combustion chamber by the single injection wheel or by the main injectors, and the starting injectors are ventilated by the pressurised air of the combustion chamber in order to avoid coke forming and so that the injectors do not clog.

Nevertheless, it appears that despite the purges of the starting injectors, coke manages to form and a progressive clogging of the starting injectors results.

At the present time, no technical solution makes it possible to suppress or to delay this phenomenon of clogging. The starting injectors are thus progressively clogged until reaching a degree of clogging such that it is difficult, or even impossible, to start the turbine engine.

In the case of starting difficulties, operators carry out breakdown search operations described in a maintenance manual of the turbine engine. These searches are generally long and not very efficient, since it is necessary to spend a sometimes considerable time before detecting the cause of the starting difficulties, in the present case the clogging of the injectors (in fact, numerous other causes may be envisaged).

Furthermore, these search operations imply an unexpected unavailability of the turbine engine, and thus of the aircraft in which it is installed, which can moreover make it necessary to cancel one or more scheduled flight missions. These operations thus represent a significant cost.

To avoid resorting to this method, it is also known to replace occasionally and in a preventive manner the starting injectors. This involves sometimes unnecessary costs, linked to the replacement of the injectors. Moreover, this solution faces difficulties of supply of parts.

There thus exists a need to be able to detect the clogging of the starting injectors, preferably before having reached a degree such that difficulties or an impossibility for starting a turbine engine are encountered.

DESCRIPTION OF THE INVENTION

The invention has the aim of overcoming the aforementioned problem, by proposing a method for monitoring a degree of clogging of the starting injectors.

Another aim of the invention is to be able to predict and anticipate the moment when the degree of clogging of the starting injectors reaches a level such that it is impossible to start the turbine engine.

In this respect, the subject matter of the invention is a method for monitoring a degree of clogging of the starting injectors of a turbine engine which includes:
- a combustion chamber, into which at least one starting injector supplied with fuel leads, said starting injectors being suitable for initiating the combustion in said chamber by igniting the fuel, and
- a turbine, rotated by the gases resulting from the combustion of the fuel in the chamber, the method being characterised in that it includes the steps involving:
- the measurement, during a phase of starting the turbine engine, of the temperature of the exhaust gases at the outlet of the turbine and,
- the determination, from the changes over time in the temperature thus measured, of a degree of clogging of the starting injectors.

Advantageously, but optionally, the method according to the invention may further include at least one of the following characteristics:
- the step of determination of the degree of clogging of the starting injectors as a function of the changes over time of the temperature of the exhaust gases at the outlet of the turbine includes:
  - the detection of a phase of fall of temperature during a phase of rise of said temperature,
  - the absence of detection of said fall corresponding to an absence of clogging of the starting injectors, and
  - the measurement of the amplitude of said fall.
- The variation in the amplitude of the fall in the temperature of the gases at the outlet of the turbine during successive startings is compared with at least one predetermined threshold, and the degree of clogging of the starting injectors is deduced from the result of said comparison.

The method further includes, during the step of measurement of the temperature of the exhaust gases at the outlet of the turbine, the measurement of the speed of rotation of the turbine, and the deduction of the degree of clogging of the starting injectors is carried out from the changes over time in the temperature of the gases and measurements of speed of rotation of the turbine.

The step of determination of the degree of clogging of the starting injectors includes:
- the measurement of the value of the speed of rotation of the turbine at the moment of the inflection point of the temperature of the gases at the outlet of the turbine initiating the fall in said temperature,
- the comparison of the variation in said value during successive startings with a predetermined threshold, and
- the deduction, from comparisons of variations of the amplitude of the fall in temperature and the value of speed of the turbine with their respective thresholds, of the degree of clogging of the starting injectors.

The method further includes the deduction, from the degree of clogging of the starting injectors, of a remaining number of startings of the turbine engine before the degree of clogging of the starting injectors reaches a level resulting in an impossibility of starting said turbine engine.

The method includes the activation of an alert so that a maintenance or a replacement of the starting injectors is carried out before the degree of clogging of the starting injectors reaches a level resulting in an impossibility of starting said turbine engine.

The subject matter of the invention is also a system for monitoring an operating state of the starting injectors of a turbine engine which includes:
- a combustion chamber, into which at least one starting injector supplied with fuel leads, said starting injectors being suitable for initiating the combustion in said chamber by igniting the fuel, and
- a turbine, rotated by the gases resulting from the combustion of the fuel in the chamber, the system for monitoring being suitable for the implementation of the method for monitoring described previously, and which includes:
- at least one temperature sensor of the gases at the outlet of the turbine (5), and
- a processing unit, comprising a memory and processing means suitable for processing the temperature measurements for the determination of a degree of clogging of the starting injectors.

Advantageously, but optionally, the system according to the invention further includes at least one of the following characteristics:
- the system further includes at least one sensor of speed of rotation of the turbine, and the processing means of the processing unit are moreover suitable for processing the measurements of speed of rotation of the turbine, for the determination of the degree of clogging of the starting injectors,
- the sensors are suitable for carrying out measurements at a frequency greater than or equal to 1 Hz.

The subject matter of the invention is also a turbine engine which includes:
- a combustion chamber, into which at least one starting injector supplied with fuel leads, said starting injectors being suitable for initiating the combustion in said chamber by igniting the fuel, and
- a turbine, rotated by the gases resulting from the combustion of the fuel in the chamber, the turbine engine further including a system for monitoring proposed by the invention.

Finally, the subject matter of the invention is an aircraft, which includes at least one turbine engine comprising:
- a combustion chamber, into which at least one starting injector supplied with fuel leads, said starting injectors being suitable for initiating the combustion in said chamber by igniting the fuel, and
- a turbine, rotated by the gases resulting from the combustion of the fuel in the chamber, the aircraft further including a system for monitoring proposed by the invention.

The method for monitoring thus proposed makes it possible to evaluate the degree of clogging of the starting injectors, and thus deducing therefrom whether it is necessary or not to carry out a maintenance, and even to schedule this maintenance while assuring that the starting of the turbine engine is possible up to said maintenance.

The logistics circuit for supplying parts for the replacement of the injectors is also better organised.

DESCRIPTION OF THE FIGURES

Other characteristics, aims and advantages of the invention will become clear from the description that follows, which is purely illustrative and non-limiting, and which should be read with regard to the appended drawings in which.

DETAILED DESCRIPTION OF AT LEAST ONE EMBODIMENT OF THE INVENTION

Figure 2:
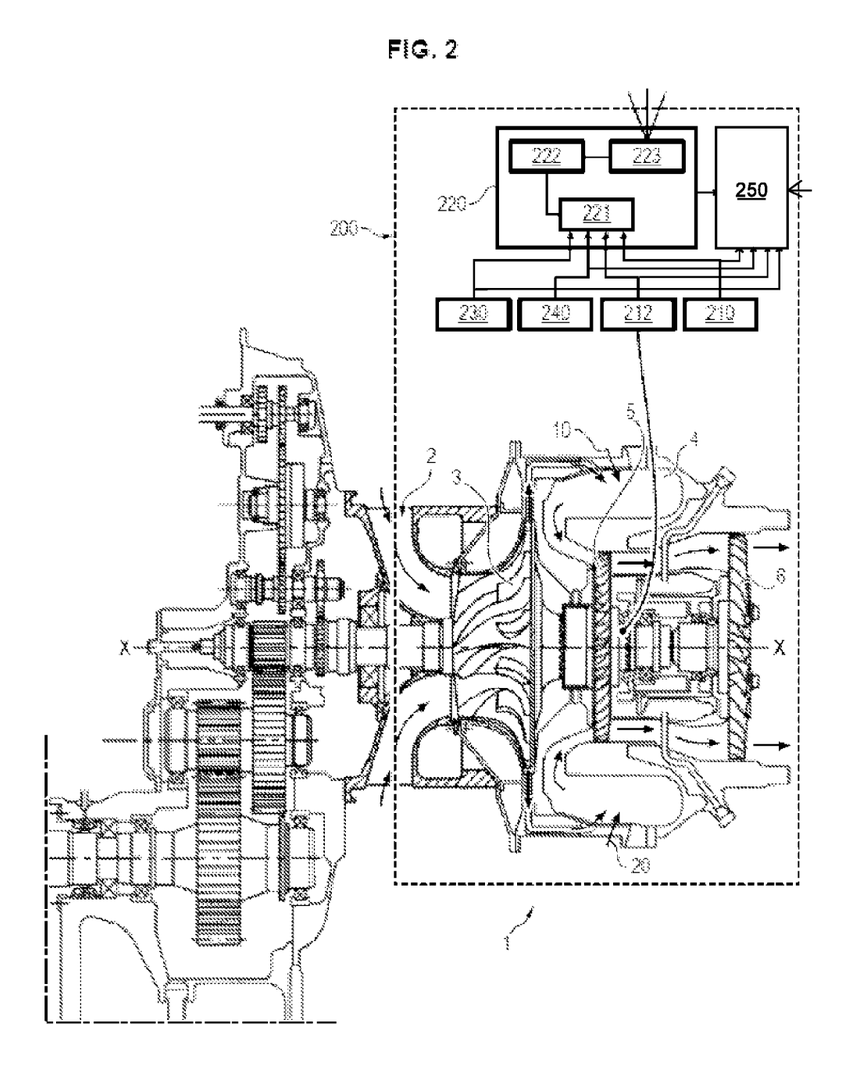
FIG. 2 represents a turboshaft engine provided with a system for monitoring the degree of clogging of the starting injectors.

With reference to FIG. 2, a turbine engine 1 of the turboshaft engine type is represented which includes successively, from upstream to downstream with respect to an air flux flowing into said turbine engine, an air intake path 2, a compressor 3, a combustion chamber 4, a turbine 5, and an exhaust pipe of the gases 6.

In a manner known per se, air penetrates into the turbine engine via the air intake path 2 and is compressed by the compressor 3.

A plurality of starting injectors 10 and main injectors 20 (symbolised by arrows in FIG. 2) penetrate into the combustion chamber 4 to ignite the fuel, the combustion being enabled by the supply of air from the compression assembly 3.

The injection of fuel takes place in the combustion chamber 4, firstly by means of starting injectors 10 for initiating the combustion of the air sucked in and the fuel, then by means of an injection wheel or main injectors, in accordance with those illustrated in FIGS. 1a and 1b.

The combustion drives the turbine in rotation around an axis of the turbine engine X-X represented in dotted line in the figure, which itself drives a propeller off-centre with respect to said axis. The gases resulting from the combustion are evacuated via the nozzle 6.

Moreover, as illustrated schematically in the figure, the turbine engine 1 includes a system 200 for monitoring a degree of clogging of the starting injectors.

This system includes a first temperature sensor 210, which may be positioned downstream of the turbine 5 of the gas generator, for measuring the temperature of the exhaust gases at the outlet of the turbine.

The system may further include at least one second sensor 212, suitable for measuring the speed of rotation of the shaft of the turbine. This sensor is for example of the electromagnetic type, positioned opposite a phonic motor, the speed of rotation of which is proportional to the speed of rotation of the shaft of the turbine.

The system also includes a processing unit 220 configured to control the temperature sensor 210, for acquiring at a determined frequency the temperature of the exhaust gases. This frequency is advantageously greater than or equal to 1 Hz.

In this respect the processing unit 220 comprises communication means 221, which may be wire-based or remote, with the sensors, as well as means of processing 222 the data acquired and a memory 223, the processing means and the memory making it possible to establish a change over time of the measured data, and to calculate from the indicators a degree of clogging of the starting injectors as described hereafter.

The processing means advantageously include a processor on which is installed a programme configured for the processing of the acquired data.

The processing means 222 are advantageously configured to enable a normalisation of the measurements carried out, that is to say to remove from the measurements certain variations which can result from the context of the acquisition, for example meteorological type variations.

Thus, the monitoring system may further include additional sensors 230 among which:
 an ambient atmospheric pressure sensor,
 an ambient temperature sensor,
 an air pressure sensor at the outlet of the compression assembly, etc.

The monitoring system may further include means for measuring 240 the voltage at the terminals of a starter of the turbine engine and the current consumed by said starter during a starting of the turbine engine, these quantities also being able to be taken into account during the determination of a degree of clogging of the starting injectors.

Finally, the system for monitoring may include communication means 250 with a system carried on-board the aircraft or with a remote base, for communicating the measurements acquired, the degree of clogging of the starting injectors deduced from said measurements, and if need be generating a maintenance alert of the turbine engine, if the degree of clogging of the starting injectors has reached or is close to reaching a level resulting in an impossibility of starting the turbine engine.

Advantageously, in the case of an aircraft comprising several turbine engines, the monitoring system is common to said turbine engines. The sensors specific to the operation of each turbine engine (for example sensors of the temperature of the gases or speed of rotation) are then multiplied to equip each turbine engine.

Moreover, the system 200 may then include means for detecting the starting order of the turbine engines.

Figure 3:
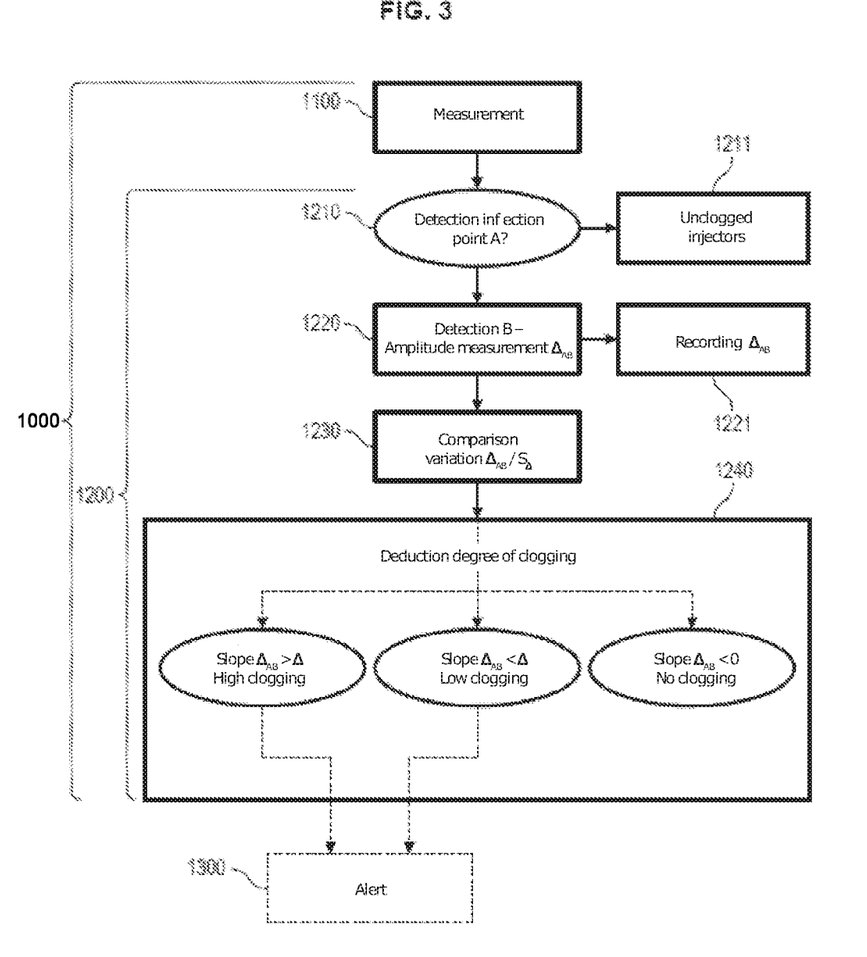
FIG. 3 represents the main steps of the method for monitoring the degree of clogging of the starting injectors.

With reference to FIG. 3, a method 1000 will now be described for monitoring the degree of clogging of starting injectors implemented by the system 200 described above.

The method is described for a turbine engine, but is applicable to the case where the system 200 carries out the monitoring of several turbine engines of a same aircraft.

This method comprises, during a phase of starting of the turbine engine, a first measurement step 1100, of the temperature T of the exhaust gases at the outlet of the turbine at a determined frequency in order to obtain the temporal evolution, during said phase, of the temperature.

Figure 4A:
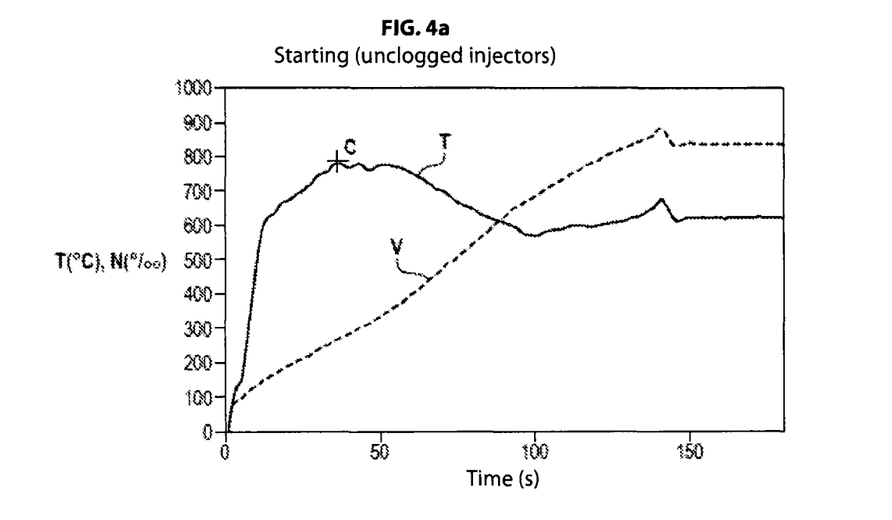
FIG. 4a represents the changes over time in the temperature of the exhaust gases at the outlet of the turbine during a phase of starting of a turbine engine and the speed of rotation of the turbine for a healthy turbine engine.
Figure 4B:
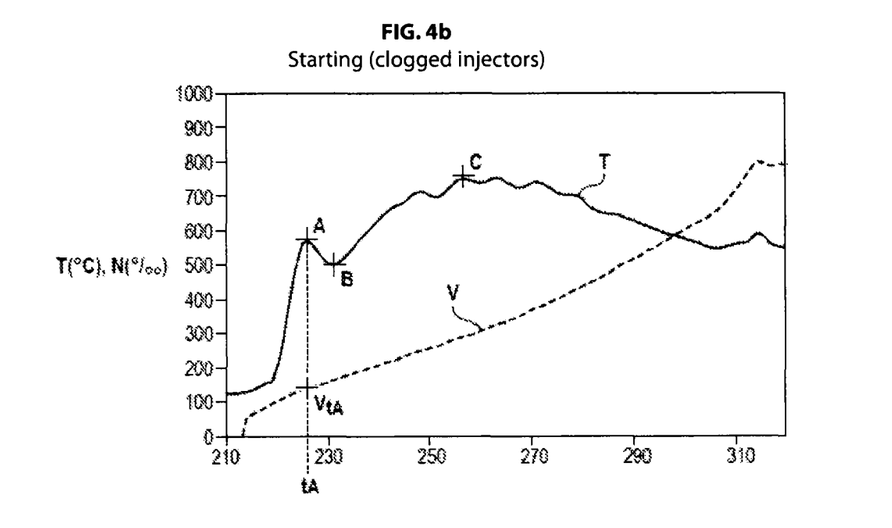
FIG. 4b represents the same changes as FIG. 4a for a turbine engine in which the injectors are pre-clogged.

In FIG. 4a is represented an example of such temporal evolution, illustrated by the bold curve, for a "healthy" turbine engine, that is to say, in which the starting injectors are not clogged, and in FIG. 4b the same temporal evolution (also illustrated by the bold curve) when the starting injectors are "pre-clogged", that is to say have an intermediate degree of clogging, between a total absence of clogging and a degree of clogging such that it is impossible to start the turbine engine.

It will be observed in FIG. 4a that, in a healthy turbine engine, the temperature of the exhaust gases has a first phase of rapid rise, until reaching a plateau, then the temperature decreases progressively until reaching a second plateau, below the first.

The first rising phase corresponds to the start-up phase of the turbine engine.

In FIG. 4b, the phase of rapid rise of the temperature of the exhaust gases is interrupted by a sharp fall, located in the figure between two inflection points A, from which the temperature drops, and B from which the elevation of the temperature picks up again.

These inflection points A and B practically never appear when the starting injectors are not clogged at all (for example when they are new). They can nevertheless appear in certain atmospheric conditions. For this reason, the simple existence of a fall in temperature does not constitute a reliable indicator of the degree of clogging of the starting injectors.

On the other hand, in the case where the curve shows this fall, it has been discovered that, the more the starting injectors show a high degree of clogging, the greater the fall in temperature between the temperature at the inflection point A and at point B is sharp and important.

It is thus deduced therefrom that the progressive increase, as startings proceed, of the amplitude of a fall in temperature of the exhaust gases at the outlet of the turbine during a phase of starting of the turbine engine is an indicator of the clogging of the injectors.

Consequently, after the measurement step 1100, the method includes a step 1200 of determination, from the acquired measurements, of the degree of clogging of the starting injectors.

This method is presented in FIG. 3 in the form of a decision algorithm implemented by the processing means 222 of the processing unit 220 and takes place as indicated hereafter.

During a first sub-step 1210, during a phase of general rise of the temperature of the gases during the start-up phase of the turbine engine, being able to be identified by means of a determined time window, a fall in said temperature is detected.

The time window is adjusted to guarantee that the fall in the temperature of the gases detected corresponds to the fall described above, which begins at the level of the inflection point A. In fact, after this first fall in temperature, the temperature again rises then has another phase of reduction (from point C), which, for its part, corresponds to the end of the starting cycle and appears conventionally whatever the degree of clogging of the starting injectors (including when the injectors are not clogged, as in FIG. 4a). The time window is thus targeted on the general phase of rise of the temperature preceding this point C. It is determined by those skilled in the art as a function of the characteristics of the turbine engine.

If the inflection point A is not detected, then it is deduced therefrom during a sub-step 1211 that the starting injectors are not clogged.

If the inflection point A is detected, the method further includes the detection 1220 of the second inflection point B, from which the temperature again increases, to be able to identify the end of the fall phase, and the measurement of the amplitude of the fall in temperature between the points A and B, that is to say the absolute value of the temperature difference between the points A and B.

The preceding steps are carried out preferably at each starting of the turbine engine, and the amplitude of the fall in temperature between the points A and B is recorded during a step 1221 with the date of the measurement, in order to be able to establish the change over time of the fall in temperature.

Then, also at each starting, at the end of the measurement step, the variation in the amplitude of the fall in temperature between A and B compared to the preceding starting(s) is compared during a sub-step 1230 with at least one predetermined threshold $S_A$.

Precisely, by noting $\Delta_{AB}$ the amplitude of the fall in temperature of the exhaust gases between the points A and B, it is possible to calculate the variation $\Delta_{AB}(j)-\Delta_{AB}(j-1)$ of $\Delta_{AB}$ between $\Delta_{AB}$ (j) at day j of the measurement, and $\Delta_{AB}$ (j the day before the measurement, to obtain a variation in degrees per day.

Alternatively, if the turbine engine is started several times a day, it is possible to calculate the variation in the amplitude of the fall in temperature of the gases from one starting to the next, by calculating $\Delta_B(d)-\Delta_{AB}(d-1)$ between $\Delta_{AB}(d)$ at the start up d during which the measurement is made and $\Delta_{AB}$ (d−1) at the preceding start up.

The threshold $S_A$ depends on the type of variation calculated (per day or per starting), and on the degree of clogging that it is going to be possible to detect from the comparison. For example, the threshold $S_A$ may be 30° C./day. It will be noted that the threshold is positive because the amplitude of the fall in temperature increases with the degree of clogging of the starting injectors.

If the calculated variation in the amplitude of the fall in temperature of the gases is negative, it is deduced therefrom that the starting injectors are not clogged, or that a measurement error exists.

If the variation is positive, it is compared with the threshold $S_A$.

As a function of the result of each comparison, the processing means deduce during a step 1240 the degree of clogging of the starting injectors.

This degree of clogging may be more or less precise as a function of the number of thresholds used to study the difference in temperature between A and B.

For example, if a single threshold $S_A$ is used, it is only possible to distinguish between two degrees of clogging: if the variation in the amplitude of the fall in temperature between A and B is comprised between 0 and the threshold, it is possible to attribute a "low" degree of clogging to the injectors, and if the variation in the amplitude of the fall is above said threshold $S_A$, it is possible to attribute a "high" degree of clogging to the injectors.

Obviously, the higher the number of thresholds, the better the degree of clogging of the starting injectors can be quantified with precision.

This degree of clogging is advantageously translated into a duration or into a number of startings remaining before reaching a level of clogging resulting in an impossibility of starting the turbine engine.

In the preceding example, the "low" degree of clogging may correspond to a medium term risk of non-starting, for example after 20 additional startings or after two weeks of use.

The "high" degree of clogging corresponds for its part to a short term risk of non-starting, that is to say after 6 additional startings or three additional days of use.

Advantageously, the method may include the generation of an alert 1300, as a function of the degree of clogging detected, or of the remaining number of days or startings before this degree of clogging reaches the impossibility of starting the turbine engine.

Taking the preceding example, in the case of "high" clogging corresponding to a short term risk of non-starting, an alert may be triggered, indicating the necessity of replacing the starting injectors as soon as possible.

Another type of alert may be provided, for example in the case of "low" degree of clogging, indicating the necessity of replacing the starting injectors during the next planned maintenance operation.

An alert may also trigger the planning of maintenance.

The alert may be given by the communication means 250 with a system carried on-board the aircraft or with a remote base, in order that an operator can detect it.

In the case where no clogging of the starting injectors has been detected, the communication means can also relay this information as a routine measure or for carrying out a monitoring over time of the injectors.

Figure 5:
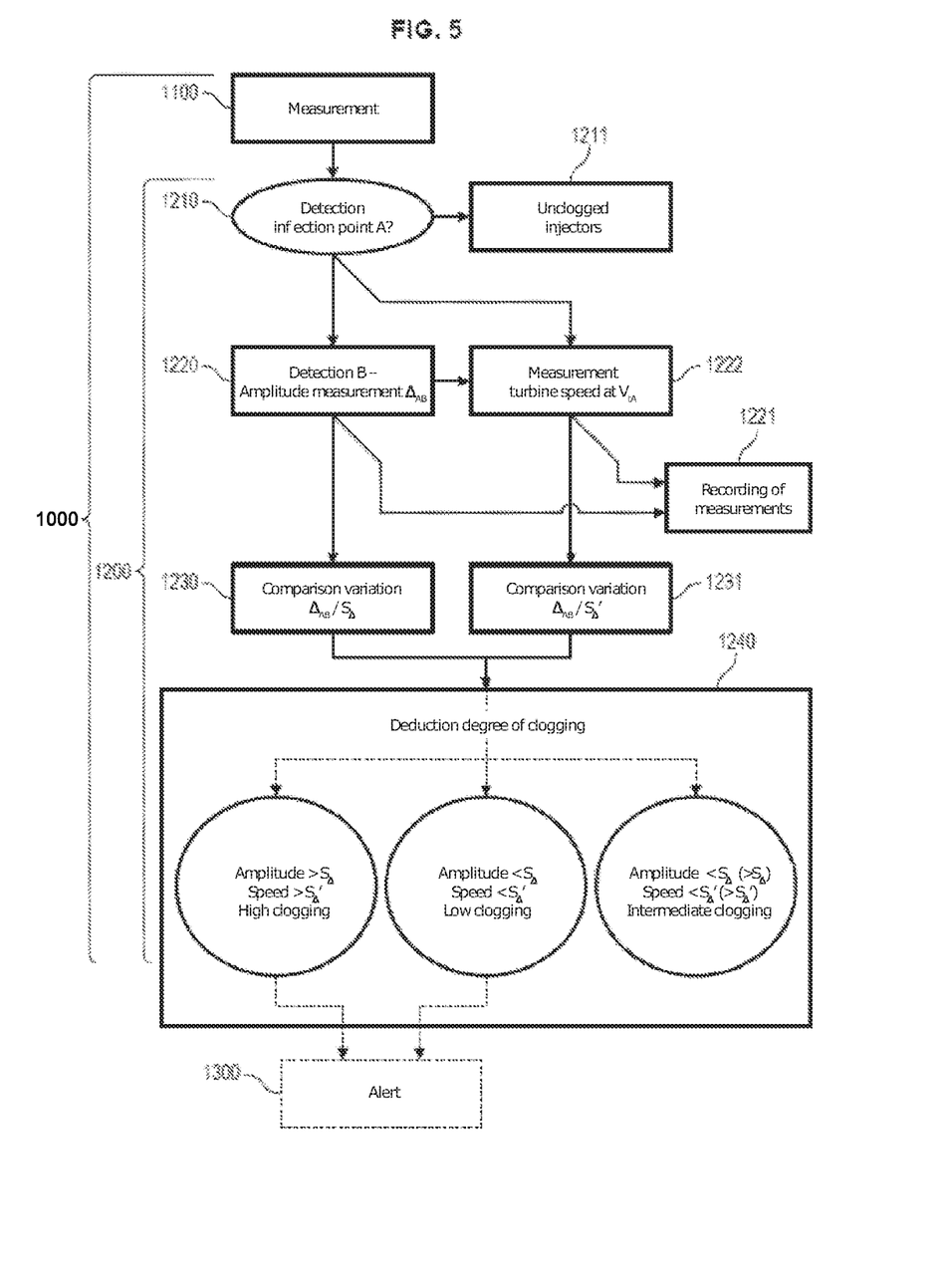
FIG. 5 represents a variant of implementation of the method of FIG. 3.

A variant of implementation of the method will now be described, represented in FIG. 5.

In this variant, the system for monitoring includes, apart from the sensor 210 for measuring the temperature of the exhaust gases at the outlet of the turbine, a sensor 212 of the speed of rotation of the shaft of the turbine.

The method 1000 still includes a step of measurement 1100, during a phase of starting of the turbine engine, and at a determined frequency, of the temperature of the exhaust gases at the outlet of the turbine in order to obtain the change over time, during said phase, of the temperature.

Furthermore, this step 1100 further includes the measurement, during the start-up phase of the turbine engine, and at a determined frequency, advantageously the same as for the measurement of temperature, of the speed of rotation of the turbine, to obtain temporal evolution of said speed.

This change over time is the second curve of FIGS. 4a and 4b, in solid, non-bold, line.

The inventors have noted that the more the injectors are clogged, the more the inflection point A is detected for a low speed of rotation of the turbine.

Another indicator of the clogging of the starting injectors is thus the measurement of the change, as the startings proceed, of the value of the speed V of rotation of the turbine at the moment $t_A$ where the inflection point A initiating the fall in the temperature of the exhaust gases appears, the speed being noted $V_{tA}$.

The estimation 1200 of the degree of clogging of the starting injectors is then carried out by comparing the two indicators.

More particularly, the method, implemented by the processing means 222 of the processing unit 220, takes place as follows.

During a sub-step 1210, as previously during a phase of rise in the temperature of the gases at the outlet of the turbine, a fall is detected in said temperature, within a determined time window.

As previously, the time window is adjusted to guarantee that the fall in the temperature of the gases corresponds to the starting phase at the inflection point A.

In the case where no fall is detected within said time window, it is deduced therefrom during a sub-step 1211 that the starting injectors are not clogged.

If the inflection point A is detected, the method further includes, on the one hand the detection 1220 of the second inflection point B, from which the temperature again raises, and the measurement of the amplitude of the fall in temperature between the points A and B, and on the other hand the measurement 1222 of the speed of rotation of the turbine at the moment of the inflection point A initiating said fall.

Moreover, the values of the amplitude of the fall in temperature between A and B and of the speed of rotation at $t_A$ are recorded during a step 1221.

Then, the variation in the amplitude of the fall in temperature between A and B is compared 1230 as previously with at least one predetermined threshold.

Furthermore, the variation in the speed of rotation of the turbine at the level of point A compared to the preceding starting(s) is also compared during a sub-step 1231 with at least one predetermined variation threshold $S_\Delta'$.

As for the variation in the amplitude of the fall in temperature between A and B, the variation in the speed of rotation of the turbine may be determined from one starting to the next or from one day to the next.

Precisely, it is possible to calculate the variation $V_{tA}(j)-V_{tA}(j-1)$ of $V_{tA}$ between $V_{tA}(j)$ on the day j of the measurement, and $V_{tA}(j-1)$ on the day before the measurement, to obtain a variation in the speed of rotation from one day to the next.

Alternatively, if the turbine engine is started several times a day, it is possible to calculate the variation in the speed of rotation at $t_A$, by calculating $V_{tA}(d)-V_{tA}(d-1)$ between $V_{tA}(d)$ at the starting d during which the measurement is made and $V_{tA}(d-1)$ at the preceding start up.

Advantageously, the speed of rotation of the turbine is expressed in percentage of the nominal speed of rotation of the turbine, which makes it possible to make the quantities measured and the threshold $S_\Delta'$ independent of the turbine engine in which the method is implemented. In the first case, the variation in the speed of rotation is expressed in % per day, and in the second case, in % compared to the last starting.

If the variation obtained is positive, this signifies that the speed of rotation at $t_A$ has increased compared to the preceding measurement, and it is deduced therefrom that the starting injectors are not clogged or that a measurement error exists.

If the variation is negative, it is compared with the negative threshold $S_\Delta'$.

The threshold $S_\Delta'$ depends on the manner of calculating the variation (per day or per starting), and on the degree of clogging that it is wished to be able to detect from the comparison. For example, the threshold $S_\Delta'$ may be chosen at −0.1%/day.

As a function of the results of these comparisons, the degree of clogging of the starting injectors during a step 1240 is deduced.

It is possible to envisage several possibilities of attribution of the level of clogging of the starting injectors, as a function of the number of thresholds for each indicator, the values of the thresholds and the desired level of security.

As a non-limiting example, it is possible to attribute a "low" degree of clogging if the variation in the amplitude of the fall in temperature between points A and B is below the predetermined threshold $S_\Delta$, and if the variation in the speed of rotation of the turbine at point A is above the threshold $S_\Delta'$.

If the variation in the amplitude of the fall is above the threshold $S_\Delta$, and if the variation in the speed of rotation of the turbine at $t_A$ is below the threshold $S_\Delta'$, a "high" degree of clogging of the injectors is deduced therefrom.

Finally, if the variation in the amplitude of the fall in temperature between A and B is above—respectively below—the threshold $S_\Delta$, and if the variation in the speed of rotation of the turbine is above—respectively below the threshold $S_\Delta'$ (that is to say that the indications supplied by the two indicators are contradictory regarding the degree of clogging of the injectors), it is possible for example to deduce therefrom an "intermediate" degree of clogging, or to relaunch the estimation method 1000.

As previously, advantageously the degree of clogging of the starting injectors is translated into a duration or into a remaining number of startings before reaching a level of clogging such that it is impossible to start the turbine engine.

Taking the same values as previously for the "low" and "high" degrees of clogging, an "intermediate" degree could correspond to a week of use remaining or to around 12 startings.

As previously, the method may include an alert step 1300, the nature of which can vary as a function of the degree of clogging detected.

The invention claimed is:

1. A method for monitoring a degree of clogging of a starting injector of a turbine engine comprising:
   a combustion chamber, into which a starting injector supplied with fuel opens, said starting injector being suitable for initiating a combustion in said combustion chamber by igniting the fuel, and
   a turbine, rotated by gases resulting from the combustion of the fuel in the combustion chamber,
   the method comprising:
   measuring, during a phase of starting the turbine engine, a temperature of exhaust gases at an outlet of the turbine; and
   determining, from changes over time in the temperature of exhaust gases thus measured, a degree of clogging of the starting injector,
   wherein the determining the degree of clogging of the starting injector as a function of the changes over time in the temperature of the exhaust gases at the outlet of the turbine comprises:
      detecting a phase of a fall of the temperature during a phase of rise of said temperature, an absence of detecting said fall corresponding to an absence of clogging of the starting injector, and
      measuring an amplitude of said fall.

2. The method for monitoring according to claim 1, further comprising:

comparing a variation in the amplitude of the fall in the temperature of the exhaust gases at the outlet of the turbine during successive startings with at least one predetermined threshold, and determining the degree of clogging of the starting injector based on the comparing.

3. The method for monitoring according to claim 1, further comprising, during the measuring the temperature of the exhaust gases at the outlet of the turbine, measuring a speed of rotation of the turbine, and in which the determining the degree of clogging of the starting injector is carried out from the changes over time in the temperature of the gases and measurements of the speed of rotation of the turbine.

4. The method for monitoring according to claim 3, wherein the determining the degree of clogging of the starting injector comprises:

measuring the value of the speed of rotation of the turbine at a moment of an inflection point of the temperature of the exhaust gases at the outlet of the turbine initiating the fall in said temperature, comparing a variation in said value during successive startings with a predetermined threshold, and determining, from comparisons of the variations of the amplitude of the fall in temperature and the value of speed of the turbine with their respective thresholds, the degree of clogging of the starting injector.

5. The method for monitoring according to claim 1, further comprising determining, from the degree of clogging of the starting injector, a remaining number of startings of the turbine engine before the degree of clogging of the starting injector reaches a level resulting in an impossibility of starting said turbine engine.

6. The method for monitoring according to claim 5, further comprising activating an alert so that a maintenance or a replacement of the starting injector is carried out before the degree of clogging of the starting injector reaches the level resulting in an impossibility of starting said turbine engine.

7. A system for monitoring an operating state of a starting injector of a turbine engine comprising:

a combustion chamber, into which a starting injector supplied with fuel leads, said starting injector being suitable for initiating a combustion in said combustion chamber by igniting the fuel, a turbine, rotated by gases resulting from the combustion of the fuel in the combustion chamber, a temperature sensor of gases at an outlet of the turbine, and a processing unit, comprising a memory and a processor configured to process temperature measurements and establishing a change over time of said temperature measurements for a determination of a degree of clogging of the starting injector, wherein the processing unit is further configured to:

detect a phase of a fall of the temperature during a phase of rise of said temperature, an absence of detecting said fall corresponding to an absence of clogging of the starting injector, and measure an amplitude of said fall.

8. The system for monitoring according to claim 7, further comprising a sensor of speed of rotation of the turbine, wherein the processing unit is further configured to process measurements of speed of rotation of the turbine, for the determination of the degree of clogging of the starting injector.

9. The system for monitoring according to claim 7, wherein the temperature sensor is suitable for carrying out measurements at a frequency greater than or equal to 1 Hz.

10. A turbine engine comprising a system for monitoring according to claim 7.

11. An aircraft comprising:

a system for monitoring according to claim 7.

* * * * *

UNITED STATES PATENT AND TRADEMARK OFFICE
CERTIFICATE OF CORRECTION

PATENT NO. : 10,145,262 B2
APPLICATION NO. : 14/768666
DATED : December 4, 2018
INVENTOR(S) : Nadir Christian Debbouz et al.

It is certified that error appears in the above-identified patent and that said Letters Patent is hereby corrected as shown below:

On the Title Page

Item (71) Applicant, change "TURBOMECA" to --SAFRAN HELICOPTER ENGINES--;

In the Specification

Column 7, Line 38, change "measurement, and $\Delta_{AB}(j)$" to --measurement, and $\Delta_{AB}(j-1)$--;

Column 7, Line 44, change "calculating $\Delta_B$" to --calculating $\Delta_{AB}$--; and Column 8, Line 36, change "planning of maintenance" to --planning of a maintenance--.

Signed and Sealed this
Twenty-sixth Day of November, 2019

Andrei Iancu
*Director of the United States Patent and Trademark Office*